United States Patent
Surman et al.

(10) Patent No.: US 9,176,000 B2
(45) Date of Patent: Nov. 3, 2015

(54) SYSTEM FOR MEASUREMENT OF FLUID LEVELS IN MULTI-PHASE FLUIDS

(71) Applicant: General Electric Company, Schenectady, NY (US)

(72) Inventors: Cheryl Margaret Surman, Albany, NY (US); William Guy Morris, Rexford, NY (US); Jon Albert Dieringer, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 278 days.

(21) Appl. No.: 13/862,644

(22) Filed: Apr. 15, 2013

(65) Prior Publication Data

US 2014/0305194 A1 Oct. 16, 2014

(51) Int. Cl.
*G01F 23/00* (2006.01)
*G01F 23/26* (2006.01)

(52) U.S. Cl.
CPC .................................... *G01F 23/26* (2013.01)

(58) Field of Classification Search
None
See application file for complete search history.

(56) References Cited

U.S. PATENT DOCUMENTS

| | | | |
|---|---|---|---|
| 4,887,798 A | 12/1989 | Julius | |
| 4,922,745 A | 5/1990 | Rudkin et al. | |
| 4,965,522 A | 10/1990 | Hazen et al. | |
| 5,734,098 A | 3/1998 | Kraus et al. | |
| 6,614,229 B1 | 9/2003 | Clark et al. | |
| 6,782,736 B1* | 8/2004 | Hammer | 73/61.44 |
| 6,864,801 B2 | 3/2005 | Tabanou et al. | |
| 7,434,457 B2 | 10/2008 | Goodwin et al. | |
| 7,455,108 B2 | 11/2008 | Jenkins et al. | |
| 7,600,423 B1* | 10/2009 | Fluhler et al. | 73/290 B |
| 7,677,307 B2 | 3/2010 | Vasques et al. | |
| 7,812,609 B2 | 10/2010 | Martinez et al. | |
| 7,958,772 B2 | 6/2011 | Permuy et al. | |
| 7,983,864 B2 | 7/2011 | Hu et al. | |
| 8,044,669 B2 | 10/2011 | Palata et al. | |
| 8,264,246 B2 | 9/2012 | Mahalingam et al. | |
| 2002/0105342 A1* | 8/2002 | Parent et al. | 324/640 |
| 2005/0161405 A1* | 7/2005 | Holland | 210/695 |

(Continued)

FOREIGN PATENT DOCUMENTS

| | | |
|---|---|---|
| GB | 2486786 A | 6/2012 |
| WO | 0107874 A1 | 2/2001 |

OTHER PUBLICATIONS

Meng et al., "Design and Testing of a Thick-Film Dual-Modality Sensor for Composition Measurements in Heterogeneous Mixtures", Institute of Physics Publishing—Measurement Science and Technology, 2005, vol. 16, pp. 1-13.

(Continued)

*Primary Examiner* — Andre Allen
(74) *Attorney, Agent, or Firm* — Mary Louise Stanford (57) ABSTRACT

A system for measuring component fluid levels in a multi-phase fluid is provided. The system includes a sensing assembly. The sensing assembly includes a primary coil and at least one secondary coil. The primary coil is wound around a sampling container that holds the multi-phase fluid. The secondary coil is disposed proximate to the primary coil and each of the at least one secondary coil is electrically connected to at least one capacitive element. Further, the system includes an analyzer that is inductively coupled to the at least one secondary coil. The analyzer is configured to measure a response of the at least one secondary coil in response to an excitation signal provided to the primary coil.

17 Claims, 7 Drawing Sheets

(56) References Cited

U.S. PATENT DOCUMENTS

| | | | |
|---|---|---|---|
| 2008/0264869 A1* | 10/2008 | Holland | 210/695 |
| 2009/0085557 A1* | 4/2009 | Krozer et al. | 324/201 |
| 2010/0102004 A1* | 4/2010 | Holland | 210/695 |
| 2011/0101996 A1 | 5/2011 | Potyrailo | |
| 2012/0150452 A1 | 6/2012 | Drobkov et al. | |
| 2012/0161787 A1 | 6/2012 | Potyrailo et al. | |
| 2012/0323503 A1* | 12/2012 | Welle | 702/55 |

OTHER PUBLICATIONS

Hale et al., "The Design of a Modular Probe Incorporating Thick-Film Sensors for Detecting Phase Interfaces in Oil Well Primary Separator Plant", Society for Experimental Mechanics, Nov.-Dec. 2006, pp. 37-43.

Fukuda et al., "Electrical Characterization Techniques of Dielectric Thin Films Using Metal—Insulator—Metal Structures", Japanese Journal of Applied Sciences, Oct. 22, 2007, vol. 46, pp. 6984-6986.

Hung et al., "A Microfluidic Platform for Manipulation and Separation of Oil-in-Water Emulsion Droplets using Optically Induced Dielectrophoresis", Journal of Micromechanics and Microengineering, Mar. 22, 2010, vol. 20, Issue 4, 9 Pages.

International Search Report and Written Opinion issued in corresponding PCT application PCT/US2014/021826 dated Jul. 18, 2104.

* cited by examiner

FIG. 9

SYSTEM FOR MEASUREMENT OF FLUID LEVELS IN MULTI-PHASE FLUIDS

BACKGROUND

The present invention relates, generally, to sensors, and, specifically, to level sensors for measuring fluid levels in multi-phase fluids.

Measurement of composition of multi-phase fluids, such as emulsions, is an important application in many industries. Determination of oil and water content of emulsions is essential at different stages in the crude oil production and refining stage. Characterization of emulsions is important in oil field management, separators, desalters, wastewater management systems, and oil quality control systems. It is important to know oil and water levels in mixtures obtained from a particular oil field to understand the overall health of the field, as well as to increase productivity and capacity of the field.

In vessel systems such as separators, oil and water and other components present in the emulsion obtained from the well are separated from each other with the help of gravity and a difference of density between different components of the emulsion. In such separators volume of components is determined by observing the interface levels, and using measurement markings on the separator columns. It is also important to measure levels of different components in an emulsion like water-oil at various stages of production of oil from a cost standpoint. Underestimating water content in a particular emulsion can lead to serious cost implications in terms of procurement of additional instruments for separating water from oil. Wastewater management is another application where it is important to characterize emulsions.

To measure oil-water composition in emulsions, demulsifiers are mixed with the emulsion and stirred to separate oil and water in the mixture. Typically, operators visually observe the level of water that gets accumulated to determine levels of water in the emulsion. This technique is prone to human errors and may lead to subsequent errors in selection of demulsifiers required to be used in vessel management systems, waste water management systems and the like.

Many types of level and interface instruments have been contemplated over the years and a subset of those have been commercialized. Among those are gamma-ray sensors, guided wave sensors, magnetostrictive sensors, microwave sensors, ultrasonic sensors, single plate capacitance/admittance sensors, segmented capacitance sensors, inductive sensors, and computed tomography sensors. Each of the sensors has advantages and disadvantages. Some of the sensors are prohibitively expensive for many users. Some of the sensors may require a cooling jacket to perform at operating temperatures (above 125° C.). Some interface instruments require a clear interface to work, which can be problematic when working with diffuse emulsions. Some are susceptible to fouling. Other sensors do not have the ability to provide a profile of the tank, but rather monitor discreet points in the desalting process. Systems using electrodes are susceptible to the shorting of electrodes in high salinity applications and are susceptible to fouling. Finally, many of these systems are complex and difficult to implement.

Some existing sensor systems have used individual capacitive elements to measure fluid levels. A key limitation of those sensor systems is their inability to simultaneously quantify several components in the liquid. Capacitance methods have been used to measure dielectric constant of a liquid using specially designed electrodes for capacitance measurements. These designs are restricted by the need for separate types of electrodes for capacitance measurements and for conductivity measurements. Inductor capacitor circuits also have been used to monitor the fluid level in a container using an electromagnetic resonator where change in capacitance was related to fluid level and fluid type. However, it has been the consensus of those of ordinary skill in the art that the filling of the resonator by a conducting liquid increased the uncertainties and noise in measurements by about one order of magnitude as compared to the values in a non-conducting fluid such as in air. However, these methods do not provide accurate measurements of concentrations of individual analytes at the limits of their minimum and maximum concentrations in the mixture.

With existing sensor systems, no one system is capable of delivering a combination of low cost, high sensitivity, favorable signal-to-noise ratio, high selectivity, high accuracy, and high data acquisition speeds. Additionally no existing system has been described as capable of accurately characterizing or quantifying fluid mixtures where one of the fluids is at a low concentration.

Hence, there is a need for a method and a system that aids in automated measurement of components of a multi-phase fluid.

BRIEF DESCRIPTION

In one embodiment, a system for measuring fluid levels in a multi-phase fluid is provided. The system includes a primary coil wound around a sampling container. The sampling container holds a sample of the multi-phase fluid. The system further includes at least one secondary coil disposed proximate to the primary coil. Further, each of the at least one secondary coil is electrically connected to at least one capacitive element. Furthermore, the system includes an analyzer that is electrically coupled to at least one secondary coil. The analyzer is configured to measure a response of the at least one secondary coil in response to an excitation signal provided to the primary coil.

In another embodiment, a method for detecting fluid levels of a component in a multi-phase fluid is provided. The method includes detecting a response of the component to an excitation signal provided to a coil assembly. The component is accumulated in a sampling container. Further, the method includes determining fluid levels of the component in the multi-phase fluid based on a relationship between the response and fluid levels of the component. The relationship between the response and the fluid levels is determined based on a response of a calibration fluid.

In yet another embodiment, a system for measuring fluid levels in a multi-phase fluid is provided. The system includes a primary coil wound around a sampling container. The sampling container holds a sample of the multi-phase fluid. The system further includes a plurality of secondary coils disposed proximate to the primary coil. Each of the plurality of secondary coils is electrically connected to a capacitive element of different value. The system further includes an analyzer, electrically connected to a primary coil, which is inductively coupled to each of the plurality of secondary coils. The analyzer is configured to measure a response of each secondary coil in response to an excitation signal provided to the primary coil.

DRAWINGS

Other features and advantages of the present disclosure will be apparent from the following more detailed description of the preferred embodiment, taken in conjunction with the accompanying drawings which illustrate, by way of example, the principles of certain aspects of the disclosure.

DETAILED DESCRIPTION

Reference will be made below in detail to exemplary embodiments of the invention, examples of which are illustrated in the accompanying drawings. Wherever possible, the same reference numerals used throughout the drawings refer to the same or like parts.

As will be discussed in greater detail below, embodiments of the present invention provide for a low cost system for sensing levels of different components in a multi-phase fluid. A multi-phase fluid includes multiple individual components. For example, oil and water component make up for majority of the volume in an oil-water emulsion. It is an important aspect of oil field management, and waste water management to determine level of water present in the emulsion being retrieved. Further, in certain processes of these systems demulsifiers are used with emulsions to separate the emulsions into different components. The efficacy of these demulsifiers needs to be tested by using the demulsifier on test emulsions. The demulsifier being tested is added to an emulsion with known quantities of components and the resulting emulsion is allowed to separate into different components in a sampling container. The present invention is disposed proximate to the sampling container to measure the amount of a component from the multiple components that separate from the original emulsion. The system for determining component levels in a multi-phase fluid such as oil-water emulsion, according to one embodiment of the present invention, includes a coil assembly. The coil assembly includes a primary coil and at least one secondary coil. The secondary coil is disposed proximate to the primary coil. The at least one secondary coil is further coupled with an analyzer to analyze a response received from the secondary coil. The primary coil, on the other hand, is connected with a power source that supplies electric signals. The electric signals in the primary coil act as excitation signal for the primary coil. The presence of excitation signal leads to an electromagnetic field around the primary coil, which leads to an induced electric potential in the secondary coil. The component present in the sampling container affects the electromagnetic field and thus leads to changes in the electric potential in the secondary coil. The changes in the electromagnetic field also lead to changes in a plurality of spectral parameters associated with the secondary coil. The analyzer coupled with the secondary coil measures the spectral parameters. The parameters that the analyzer captures for determination of component levels include, but are not limited to, the complex impedance response, resonance peak position, peak width, peak height and peak symmetry of the impedance response of the "sensor", magnitude of the real part of the impedance, resonant frequency of the imaginary part of the impedance, anti-resonant frequency of the imaginary part of the impedance, zero-reactance frequency, phase angle, and magnitude of impedance, and others. Further, in the system, the output of the analyzer is subjected to analysis through a processing sub-system that determines a relation between the spectral parameters and level of component present in the sampling container. Based on the relationship, an actual level of component in the sampling container is determined. This determination is used to determine the efficacy of the demulsifier being used to separate the emulsions under test.

Figure 1:
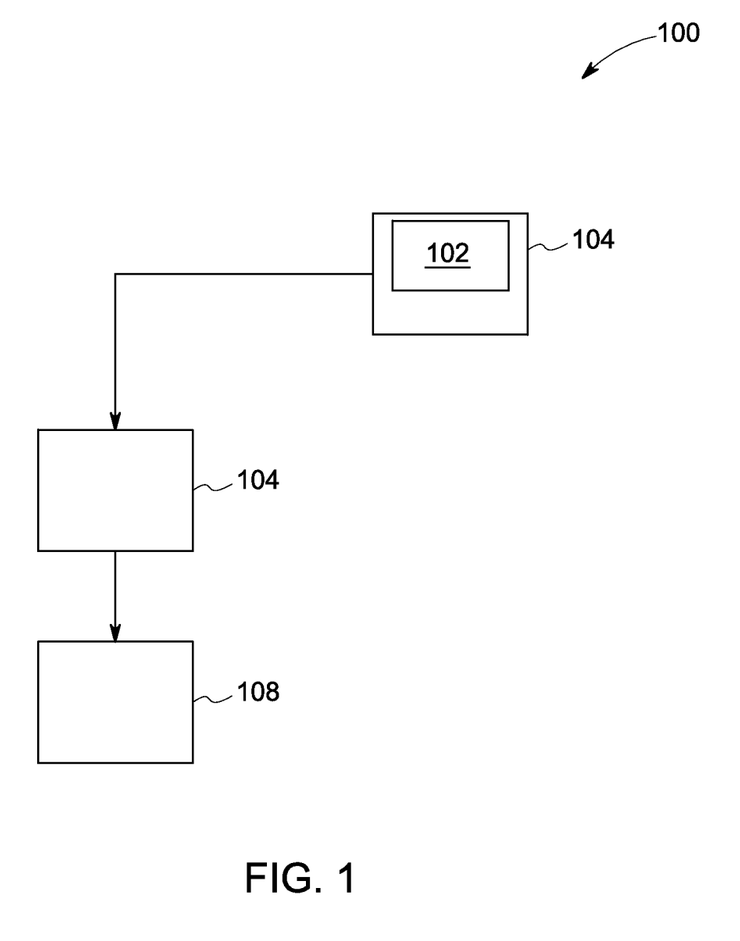
FIG. 1 is an illustration of a resonant sensor system.

FIG. 1 illustrates a sensor system for determination of component levels in a multi-phase fluid. The sensor system 100 includes a sensor 102, a sampling container 104, an analyzer 106 and a processing sub-system 108. The sampling container 104, according to certain embodiments, is a baffle tube. The sampling container 104 may, for example, be made of material that is resistant to fouling such as Polytetrafluoroethylene (PTFE), a synthetic fluoropolymer of tetrafluoroethylene. The sensor 102 is placed proximate to the sampling container such that walls of the sampling container 104 separate the sensor 102 from the multi-phase fluid present in the sampling container 104.

The multi-phase fluid present in the sampling container 104 may, for example, be a mixture of oil, water, and a demulsifier. The sampling container 104 may be a part of a desalter simulation set-up. The sampling container 104 from the desalter simulation setup, according to certain embodiments, may include rotating blades that operate as blending blades. The rotating blades aid in mixing the multi-phase fluid with the demulsifier. In the sampling container 104, according to some embodiments, there is a present a narrow holding area that holds a component from the multi-phase fluid that is separated after the demulsifier and the multi-phase fluid are mixed vigorously and allowed to settle thereafter. An example desalter static simulator system is described in U.S. application Ser. No. 12/958,656, commonly assigned to General Electric Company. The sensor 102, according to certain embodiments, is configured to measure the volume of the component collected in the narrow holding area of the sampling container 104.

The sensor 102 is provided with excitation signals provided from a power source that is coupled to the sensor 102. The excitation signals provided to the sensor 102 lead to an electromagnetic field that interacts with the component of the multi-phase fluid present in the holding area of the sampling container 104. The interaction with the component leads to changes in the plurality of parameters pertaining to the sensor 102. The operation of the sensor 102 is explained in greater detail in conjunction with FIG. 2. The analyzer 106 coupled with the sensor 102 captures this information and communicates to the processing sub-system 108. The processing sub-system 108 is configured to determine a relationship between the parameters detected by the analyzer 106 and the level of the component of the multi-phase fluid that is present in the holding are of the sampling container 104. According to certain embodiments, the processing sub-system 108 is configured to perform multivariate analysis on the parameters detected by the analyzer 106. Applied multivariate analysis reduces the dimensionality of the multi-variable response of the sensor 102 to a single data point in multidimensional space for selective quantitation of different parameters of interest. Non-limiting examples of multivariate analysis tools are canonical correlation analysis, regression analysis, non-linear regression analysis, principal components analysis, discriminate function analysis, multidimensional scaling, linear discriminate analysis, logistic regression, and/or neural network analysis. By applying multivariate analysis of the parameters, quantification of levels of components in the multi-phase fluid may be performed with the sensor 102. Besides measurements of the complex parameters, it is possible to measure other parameters related to the response received from the sensor 102. Examples include, but are not limited to, S-parameters (scattering parameters) and Y-parameters (admittance parameters). Using multivariate analysis of data from the sensor 102, it is possible to achieve simultaneous quantification of multiple parameters of interest with a sensor 102.

The processing sub-system 108, according to certain embodiments, is coupled to a chipset, which includes a memory controller and an input/output (I/O) controller. As is well known, a chipset typically provides I/O and memory management functions as well as a plurality of general purpose and/or special purpose registers, timers, etc. that are accessible or used by one or more processors coupled to the chipset. The memory controller performs functions that enable the processing sub-system 108 (or processors if there are multiple processors) to access a system memory and a mass storage memory.

The system memory may include any desired type of volatile and/or non-volatile memory such as, for example, static random access memory (SRAM), dynamic random access memory (DRAM), flash memory, read-only memory (ROM), etc. The mass storage memory may include any desired type of mass storage device including hard disk drives, optical drives, tape storage devices, etc.

The I/O controller performs functions that enable the processing sub-system 108 to communicate with peripheral input/output (I/O) devices and network interfaces via communication buses. The I/O devices may be any desired type of I/O device such as, for example, a keyboard, a video display or monitor, a mouse, etc. The network interfaces may be, for example, an Ethernet device, an asynchronous transfer mode (ATM) device, an 802.11 device, a DSL modem, a cable modem, a cellular modem that enable the processing sub-system 108 to communicate with another processing sub-system. Data from the analyzer 106 may be communicated to the processing sub-system 108 through I/O buses using the appropriate bus connectors.

Figure 2:
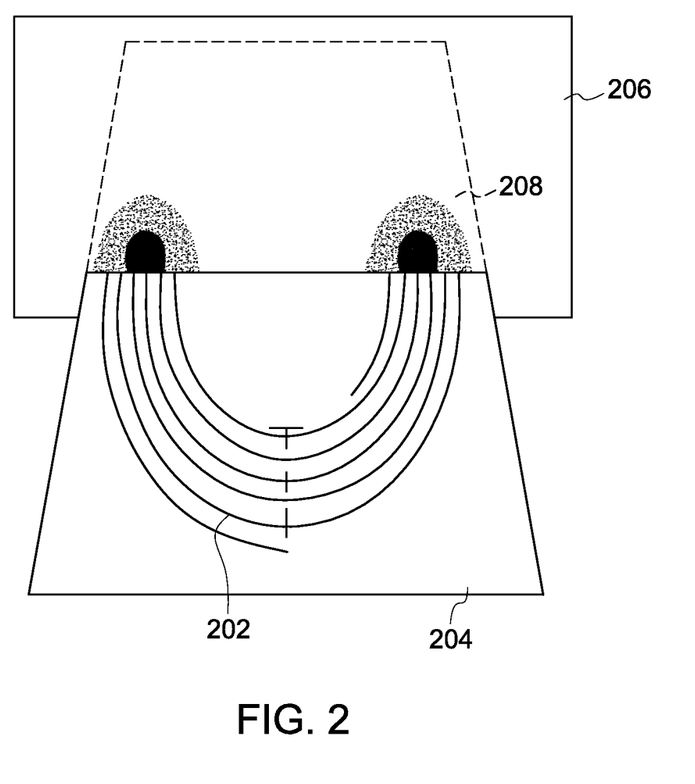
FIG. 2 is an illustration of the operation of the resonant sensor system of FIG. 1.

As shown in FIG. 2, the sensor 102 includes an antenna 202 disposed on a substrate 204. The sensor 102 may be separated from the ambient environment with a dielectric layer 206. In some embodiments, the thickness of the dielectric layer 206 may range from 2 nm to 50 cm, more specifically from 5 nm to 20 cm; and even more specifically from 10 nm to 10 cm. In some applications the resonant transducer 102 may include a sensing film deposited onto the antenna 202. In response to environmental parameters an electromagnetic field 208 may be generated in the antenna 202 that extends out from the plane of the sensor 102. The electromagnetic field 208 may be affected by the dielectric property of an ambient environment providing the opportunity for measurements of physical parameters. The sensor 102 responds to changes in the complex permittivity of the environment. The real part of the complex permittivity of the fluid is referred to as a "dielectric constant". The imaginary part of the complex permittivity of the fluid is referred to as a "dielectric loss factor". The imaginary part of the complex permittivity of the fluid is directly proportional to conductivity of the fluid.

Measurements of fluids can be performed using a protecting layer that separates the conducting medium from the antenna 202. Response of the sensor 102 to the composition of the fluids may involve changes in the dielectric and dimensional properties of the resonant transducer 12. Examples of parameters that may show changes due to the interaction between electromagnetic field 208 and the ambient environment include, but are not limited to, capacitance, resistance, inductance, and resonant frequency of the sensor 102. These changes are related to the analyzed environment that interacts with the sensor 102. The fluid-induced changes in the sensor 102 affect the complex impedance of the antenna 202 through the changes in material resistance and capacitance between the antenna turns.

Figure 3:
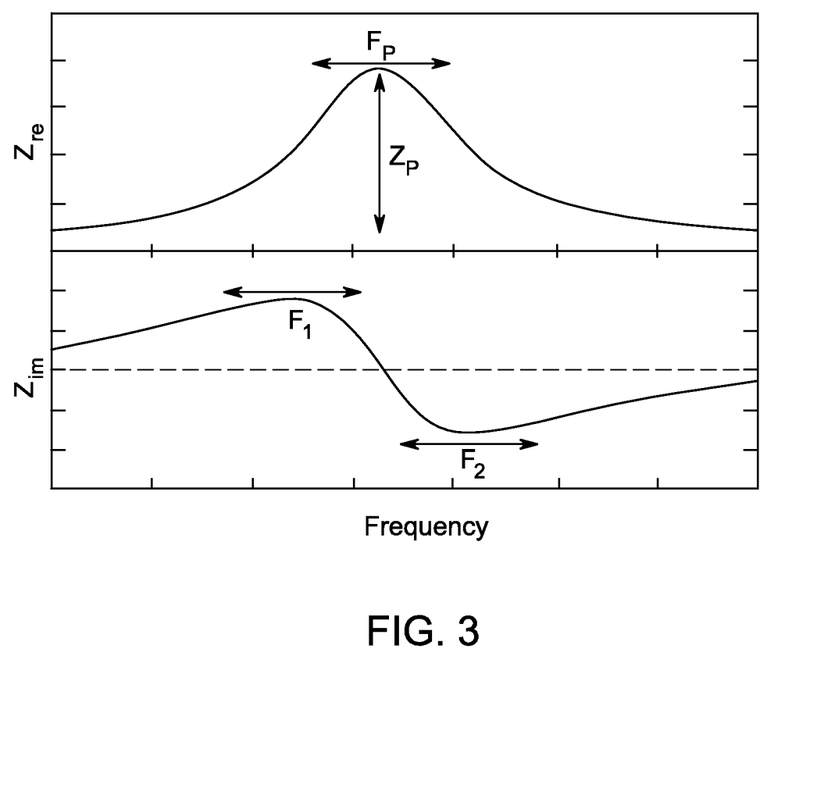
FIG. 3 is an example of a response analyzed by an analyzer connected to the resonant sensor system.

For selective fluid characterization using a sensor 102, a complex impedance spectrum of the sensor antenna 202 are measured as shown in FIG. 3. At least three data points of impedance spectra of the multi-phase fluid in the sampling container 104 are measured. Better results may be achieved when at least five data points of the impedance spectra of the emulsion are measured. Non limiting examples of number of measured data points are 8, 16, 32, 64, 101, 128, 201, 256, 501, 512, 901, 1024, 2048 data points. Spectra may be measured as a real part of impedance spectra or an imaginary part of impedance spectra or both parts of impedance spectra. Non-limiting examples of LCR resonant circuit parameters include impedance spectrum, real part of the impedance spectrum, imaginary part of the impedance spectrum, both real and imaginary parts of the impedance spectrum, frequency of the maximum of the real part of the complex impedance (Fp), magnitude of the real part of the complex impedance (Zp), resonant frequency (F1) and its magnitude (Z1) of the imaginary part of the complex impedance, and anti-resonant frequency (F2) and its magnitude (Z2) of the imaginary part of the complex impedance.

The sensor 102 utilized to obtain responses illustrated in FIG. 3 include a primary coil and at least one secondary coil. Detailed embodiments of the sensor 102 are described in conjunction with FIGS. 4 and 5.

Figure 4:
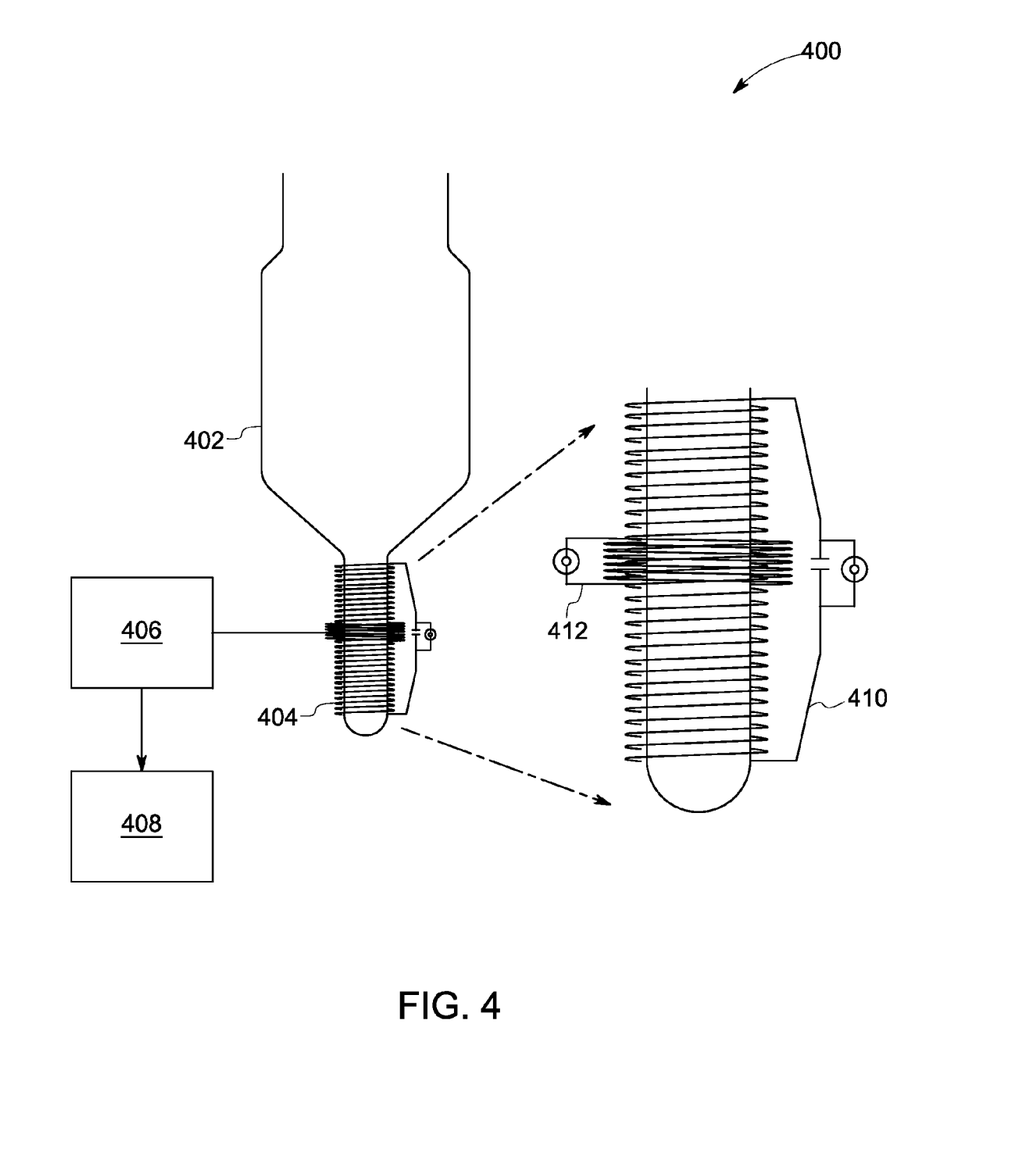
FIG. 4 is an illustration of a sensor for measuring fluid levels in a multi-phase fluid according to one embodiment of the present invention.

FIG. 4 illustrates one embodiment of a sensor system 400 for measuring fluid level of a component in a multiphase fluid. The system 400 includes sampling container 402, sensing assembly 404, analyzer 406, and a processing sub-system 408. The sensing assembly 404 includes a primary coil 410, and at least one secondary coil 412.

The sampling container 402 acts as a layer of dielectric material between the component of the multi-phase fluid and the sensing assembly 404. The layer of dielectric material plays an important role in creating a response at the secondary coil 412. In the sampling container 402, the multi-phase fluid is mixed with a demulsifier that separates different components of the multi-phase fluid. According to one embodiment, the sampling container 402 is a baffle tube. According to certain embodiments, the sampling container 402 is made from material resistant to fouling such as Polytetrafluoroethylene (PTFE), a synthetic fluoropolymer of tetrafluoroethylene. According to certain other embodiments, sample of the multi-phase fluid may be collected in the sampling container 402 from a vessel system through an assembly such as the try-line assembly. Examples of vessel system include, but are not limited to, desalters, separators, reactors, and storage tanks. The try-line assembly may be a plurality of pipes open at one end inside a multi-phase fluid carrying vessel with an open end permanently positioned at the desired vertical position or level in the vessel for withdrawing liquid samples at that level. There are generally a plurality of sample pipes in the vessel, each with its own sample valve, with the open end of each pipe at a different vertical position inside the unit, so that liquid samples can be withdrawn from a plurality of fixed vertical positions in the unit. Another approach to collect samples of the multi-phase fluid involves the usage of a swing arm sampler. A swing arm sampler is a pipe with an open end inside the fluid carrying vessel typically connected to a sampling valve outside the unit. It includes an assembly used to change the vertical position of the open end of the angled pipe in the vessel, by rotating it, so that liquid samples can be withdrawn (or sampled) from any desired vertical position.

During the process of separation of the component in the multi-phase fluid in the sampling container 402, at least one component is collected in the holding area 414 of the sampling container 402. The sensing assembly 404 that comprises the primary coil 410 and the secondary coil 412 may be disposed proximate to the holding area 414 to determine level of the component accumulated in the holding area 414. The primary coil 410 and the secondary coil 412, according to certain embodiments, are wound around holding area 414 of the sampling container 402.

The primary coil 410 and the secondary coil 412 are made from metallic wires. According to certain embodiments, number of turns of the primary and secondary coils are selected based on a desired range of response that the sensing assembly 404 is expected to cover. In the embodiment illustrated in FIG. 4, the primary coil includes 7 turns of a wire that is 0.02 inches wide. The secondary coil includes 42 turns of a wire that is 0.02 inches wide. The primary and secondary coils 410 and 412 are made from metallic material such as copper, and aluminum. The primary coil 410 and the secondary coil 412, according to one embodiment, are disposed proximate to each other. In the illustrated embodiment, the primary coil 410 encapsulates the secondary coil 412.

The primary coil 410 and the secondary coil 412 are further coupled with a capacitive element to create an inductive-capacitive resonant circuit from the primary and secondary coil 410 and 412. The primary coil 410 is further coupled with a power source that provides excitation signals. The secondary coil 412 is coupled with the analyzer 406. The secondary coil 412 and the analyzer may be coupled through wired or wireless communication channels. The analyzer 406 according to certain embodiments is an impedance analyzer. According to certain embodiments, the analyzer 406 is at least one of dual-channel vector voltmeter, or a vector network analyzer. The analyzer 406 is configured to measure responses induced in the secondary coil 412 when excitation signal is provided to the primary coil 410. The parameters determined by the analyzer 406 include, among others, changes in capacitance, inductance, and resistance of the secondary coil 412, and the resonant frequency of the secondary coil 412. The parameters measured by the analyzer 406 are communicated to the processing sub-system 408 through wired or wireless communication channels. The processing sub-system 408 is configured to determine a relationship between the paramaters determined by the analyzer 406 and level of the component present in the holding area 414 of the sampling container 402.

The processing sub-system 408, according to certain embodiments, is configured to determine the relationship between the response of the secondary coil 412 and the component fluid level in the sampling container 402 using responses generated by a using the sensing assembly 406 on a calibration fluid with known measures of different components. The calibration fluid is added to the sampling container 402 and response of the secondary coil 412 is measured for the excitation signal provided to the primary coil 410. Different sets of calibration responses are collected for different calibration fluids with known volumes of components. The processing sub-system 408 is configured to determine the relationship between the collected responses from the calibration fluid and the known volume levels of the components from the calibration fluid. The processing sub-system 408 utilizes multivariate analyses to determine this relationship. The processing sub-system 408 is further configured to utilize results of the multivariate analysis performed on calibration results to determine the component fluid levels of the fluid present in the sampling container 402 for which responses are being collected from the secondary coil 412.

According to certain embodiments, the sensor assembly 404 includes more than one secondary coil 412. Multiple secondary coils are coupled to the primary coil 410. Each secondary coil is configured to respond to different levels of component present in the holding area 414 of the sampling container 402.

Figure 5:
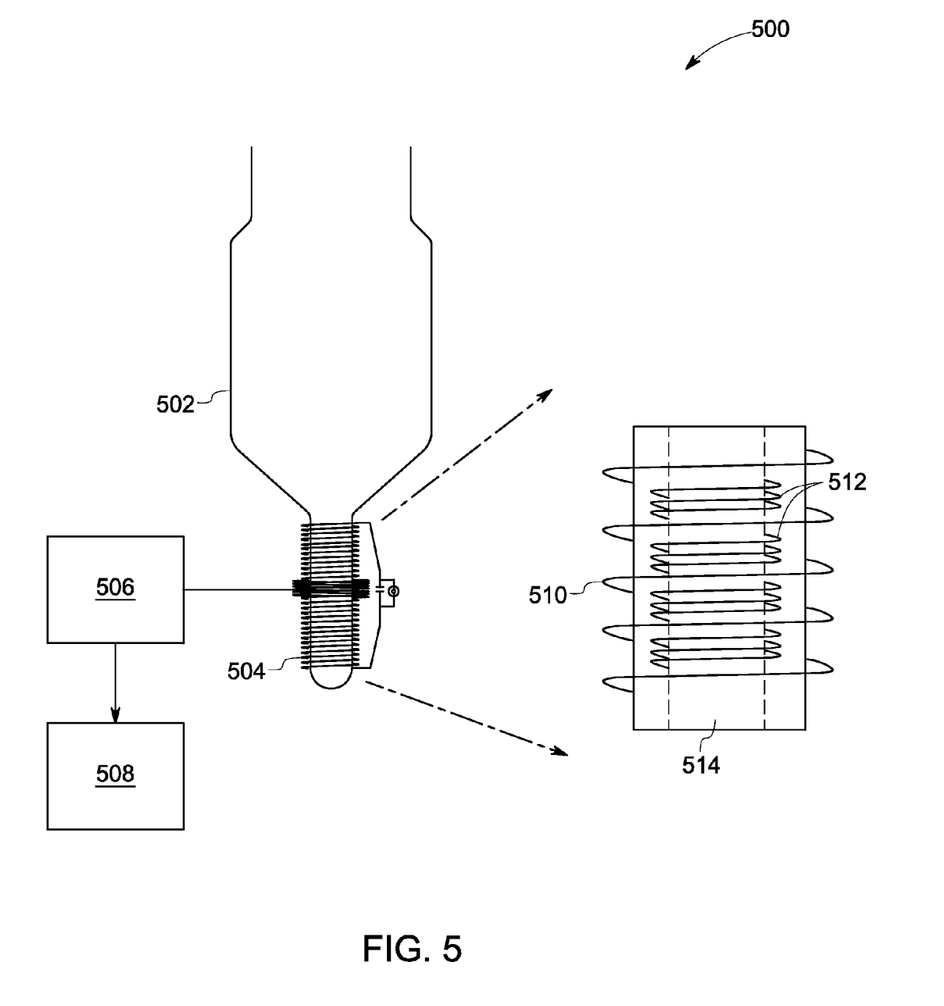
FIG. 5 is an illustration of a sensor for measuring fluid levels in a multi-phase fluid according to another embodiment of the present invention.

FIG. 5 is an illustration of a system 500 for measuring fluid levels of a component in a multi-phase fluid according to another embodiment of the present invention. The system 500 for measuring component fluid levels in a multi-phase fluid includes sampling container 502, sensing assembly 504, analyzer 506, and processing sub-system 508. The sampling container 502 has been described in greater detail in conjunction with FIG. 4. Sample of multi-phase fluid is held in the sampling container 502 using one or more of the techniques described in conjunction with FIG. 4. In one embodiment, the sample of the multi-phase fluid and demulsifiers are mixed together and allowed to separate in the sampling container 502. During separation, one component of the multi-phase fluid settles in a holding area 514 of the sampling container 502. The sensing assembly 504 is configured to determine the volume of the fluid present in the holding area 514 of the sampling container 502. The sensing assembly 504, according to one embodiment, is placed proximate to the sampling container 502. According to another embodiment, a primary coil 510 of the sensing assembly 504 is wound around the holding area 514 of the sampling container 502. The plurality of secondary coils 512 are disposed proximate to the primary coil 510 such that the primary coil 510 and each of the plurality of secondary coils 512 are inductively coupled. The primary coil 510 and each of the plurality of secondary coils 512 are also electrically coupled with capacitive elements. Each of the plurality of secondary coils 512 is coupled with a capacitive element of different value to allow each of plurality of secondary coils 512 to form a different LCR circuit with the primary coil 510. The primary coil 510 is coupled with a power source that provides an excitation signal. The excitation signal and presence of the component in the holding area 514 cause for change in at least one of a capacitance, resistance, inductance, or resonant frequency due to an inductive effect in each of the plurality of secondary coils 512. The changes in each of the plurality of secondary coils 512 are measured by the analyzer 506 that is inductively coupled with each of the plurality of secondary coils 512 through the primary coil 510.

Different capacitive elements are coupled with each of the plurality of secondary coils 512 such that the resonant frequency of a combination of the primary coil 510 with each of the plurality of secondary coils 512 varies across the length of the holding area 514. The difference in resonant frequencies allows for detection of component fluid levels in the holding area 514 at different volume levels. For example, when the component settles towards that end of the holding area 514 that is away from the rest of the sampling container 502, the combination of primary coil 510 and one of the plurality of secondary coils 512 located proximate to the bottom region of the holding area 514 is used to determine the volume of the component. The analyzer 506 receives response of the plurality of secondary coils 512 in form of changes in multiple parameters associated with the plurality of secondary coils 512.

The data received from the analyzer 506 is analyzed by the processing sub-system 508 to determine the volume of the component present in the holding area 514 of the sampling container 502. According to one embodiment, an average of responses received from each of the plurality of secondary coils 512 is calculated and communicated to the processing sub-system 508. In another embodiment, data from each of the plurality of secondary coils 512 is communicated by the analyzer 506 to the processing sub-system processing sub-system 508, separately. The processing sub-system 508 is configured to utilize multivariate analyses to determine a relationship between the responses received from the plurality of secondary coils 512 and the actual level of the component in the holding area 514 of the sampling container 502. In certain embodiments, multivariate analyses performed by the processing sub-system 508 develop a relationship between the average of responses from plurality of secondary coils 512 and the level of the component. In certain other embodiments, multivariate analyses performed by the processing sub-system 508 develop a relationship between the responses from each of the plurality of secondary coils 512 and the level of the component.

Figure 6:
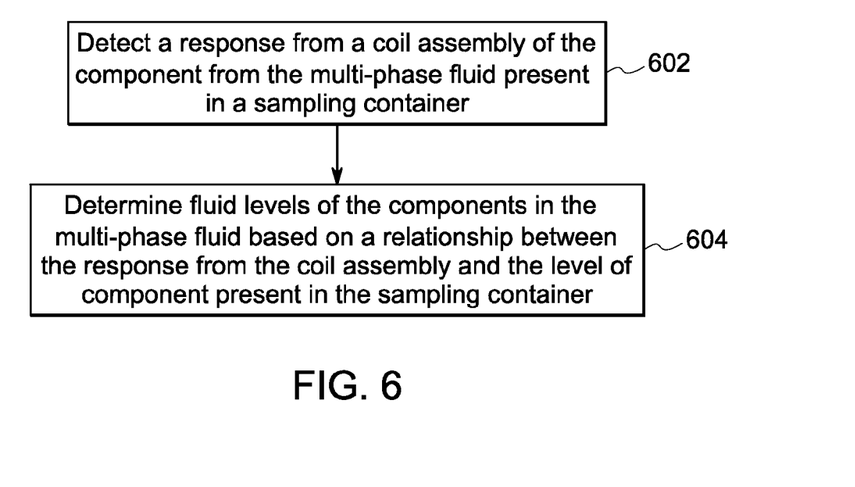
FIG. 6 is a block diagram of a method for determining fluid level of a component in a multi-phase fluid according to one embodiment of the present invention.

FIG. 6 illustrates a block diagram of a method for determining component fluid levels in a multi-phase fluid. The method includes a step 602 of detecting a response from a coil assembly of the component from the multi-phase fluid present in a sampling container. The sampling container, according to certain embodiments, is the sampling container 402 as described in conjunction with FIG. 4. Further, the method includes a step 604 of determining fluid levels of the components in the multi-phase fluid based on a relationship between the response from the coil assembly and the level of component present in the sampling container. According to one embodiment, the coil assembly is the sensor assembly 406 or sensor assembly analyzer 506 described in conjunction with FIGS. 5 and 6 respectively.

The relationship between the responses received from the coil assembly and the component level in the sampling container is determined by utilizing multivariate analysis. Non-limiting examples of multivariate analysis tools are canonical correlation analysis, regression analysis, nonlinear regression analysis, principal components analysis, discriminate function analysis, multidimensional scaling, linear discriminate analysis, logistic regression, partial least square analysis, and/or neural network analysis. The multivariate analysis is performed using known values of the component in a sample multi-phase fluid and responses received from the coil assembly for these known values of the component.

Figure 7:
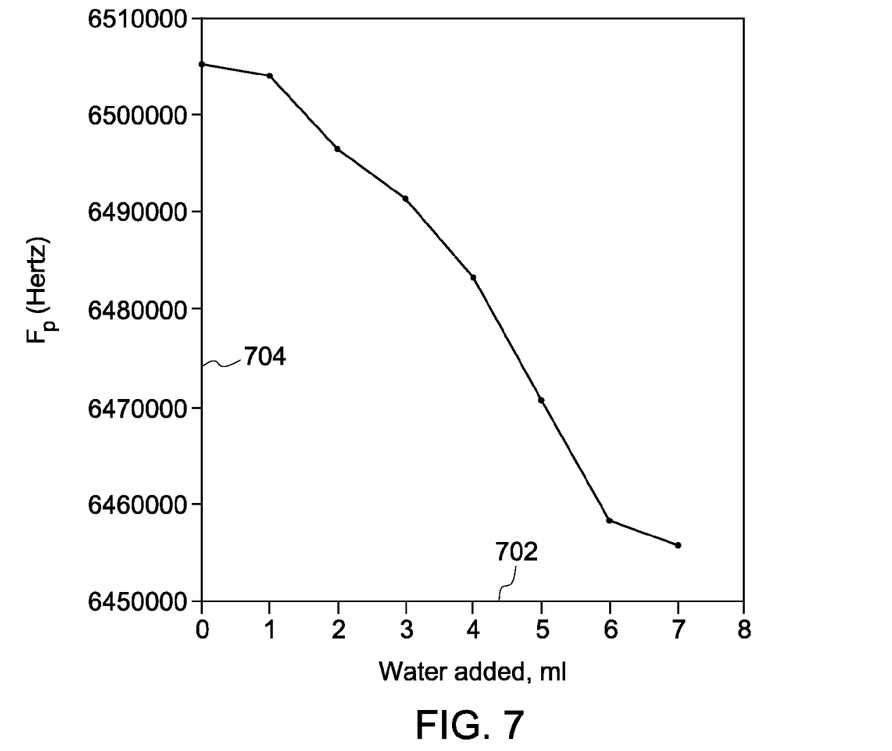
FIG. 7-9 is an illustration of a response received from the sensors of the present invention.
Figure 8:
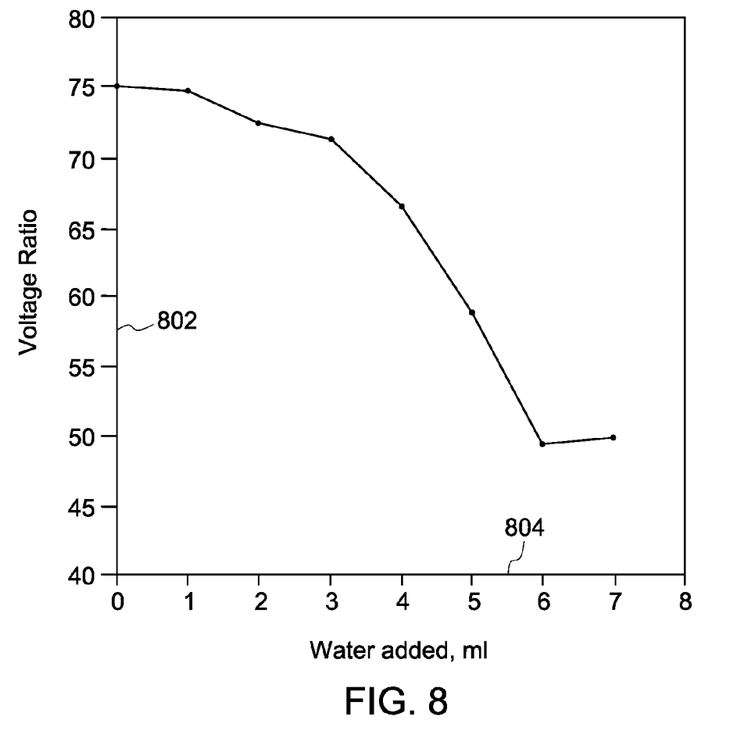
Figure 9:
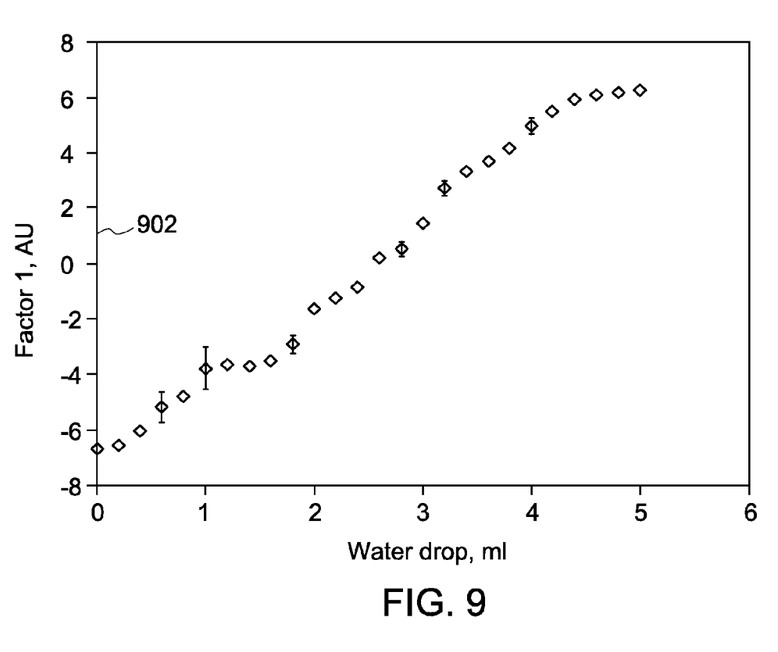

FIGS. 7-9 is an illustration of a response received from the sensors of the present invention. FIG. 7 illustrates a response collected from secondary coil 412 of the sensing assembly 406. On the X-axis 702, component, for example water, levels are plotted. On the Y-axis 704, Fp (frequency shift of real impedance pertaining to the secondary coil 412) is plotted. FIG. 7 illustrates that the frequency shift decreases as level of the component increases in the multi-phase fluid. The relationship illustrated in FIG. 7 is utilized to develop a relationship between the frequency shift parameter of the response and the level of the component through multivariate analyses. FIG. 8, similarly, illustrates a relationship between a voltage ratio on Y-axis 802, and level of the component on X-axis 804. The voltage ratio is a ratio of voltage observed across the primary coil against voltage observed across the secondary coil. FIG. 9 illustrates a relationship between parameters obtained through response collected from the secondary coil 512 of the sensing assembly 504 and level of component present in the holding area 514 of the sampling container 502. The parameter plotted on the Y-axis 902 of FIG. 9 is calculated by converting the plurality of parameters measured for each of the plurality of secondary coils 512 to unit variance. The relationship shown in FIG. 9 is used to determine a relationship between the parameters calculated from responses of each of the plurality of secondary coils 512 and the level of the component in the sampling container 502.

Monitoring changes of the complex impedance of the circuit and applying multivariate analysis of the impedance spectra, in experimental setups, allowed for the composition and continuous phase of oil-in-water and water-in-oil mixtures to be predicted with a standard error of 0.04% in 0-30% water and 0.26% in 30-100% water. Multivariate analysis tools in combination with data-rich impedance parameters allowed for elimination of interferences.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example. Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet, and may use a wide variety of different communication protocols. Those skilled in the art will appreciate that such network-computing environments will typically encompass many types of computer system configurations, including personal computers, handheld devices, multi-processor systems, microprocessor-based or programmable consumer electronics, network PCs, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system determining component fluid levels in a multi-phase fluid, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system for measuring a fluid level in a multi-phase fluid comprising:
    a sampling container configured to hold a sample of the multiphase fluid, wherein the sampling container comprises dielectric material;
    a sensor assembly, comprising:
        a primary coil wound around the sampling container; and
        a secondary coil disposed proximate to the primary coil and wound around the sampling container, wherein the secondary coil is electrically connected to a capacitive element and wherein the sampling container is configured to act as a dielectric layer between the sensor assembly and the sample of the multiphase fluid; and
    an analyzer inductively coupled to the secondary coil to measure a response of the secondary coil in response to an excitation signal provided to the primary coil.

2. The system as recited in claim 1, wherein the response of the secondary coil is measured in terms of at least one of a change in capacitance, a resistance, and an inductance of the secondary coil, and a resonant frequency of the secondary coil.

3. The system as recited in claim 1, wherein the multi-phase fluid comprises an emulsion that is at least one of a water-in-oil emulsion and an oil-in-water emulsion.

4. The system as recited in claim 1, wherein samples of the multi-phase fluid are collected from a vessel system and stored in the sampling container, wherein the vessel system is selected from a group comprising a desalter, a separator, a reactor, and a storage tank.

5. The system as recited in claim 1, wherein the sampling container is a baffle tube.

6. The system as recited in claim 1, wherein the analyzer comprises at least one of a dual-channel vector voltmeter and a vector network analyzer.

7. The system as recited in claim 1, further comprises a processing sub-system, wherein the processing sub-system is coupled with the analyzer to perform analysis of the response of the secondary coil.

8. The system as recited in claim 7, wherein the processing sub-system is configured to:
    determine a relationship between the response of the secondary coil and the fluid level based on a response generated by a calibration fluid in the sampling container; and
    apply the relationship to a real time response reading of the secondary coil.

9. The system as recited in claim 7, wherein the processing sub-system is configured to utilize multivariate analyses to analyze the response of the secondary coil.

10. The system as recited in claim 1, wherein the secondary coil comprises a plurality of secondary coils that are inductively coupled to the primary coil, wherein each of the plurality of secondary coils exhibit different resonant frequencies.

11. A method for detecting a fluid level of a component in a multi-phase fluid held in a sampling container, the method comprising:
    providing an excitation signal to a coil assembly, wherein the coil assembly comprises a primary coil and a secondary coil wound around the sampling container and wherein the sampling container is configured to act as a dielectric layer between the sensor assembly and the component;

detecting a response of the component to the excitation signal provided to the coil assembly; and determining the fluid level of the component in the multiphase fluid based on a relationship between the response of the component and the fluid level of the component, wherein the relationship is determined based on a response of a calibration fluid.

12. The method as recited in claim 11, wherein the secondary coil is disposed proximate to the primary coil.

13. The method as recited in claim 12, wherein the secondary coil comprises a plurality of secondary coils, wherein each of the plurality of secondary coils exhibit different resonant frequencies.

14. The method as recited in claim 12, wherein detecting the response of the component to the excitation signal further comprises:

providing the excitation signal to the primary coil; and collecting the response induced in the secondary coil due to the presence of the component in the sampling container and the excitation signal provided to the primary coil.

15. The method as recited in claim 12 further comprises coupling the secondary coil with an analyzer to analyze the response.

16. A system for measuring fluid levels in a multi-phase fluid comprising:

a sampling container configured to hold a sample of the multiphase fluid, wherein the sampling container comprises dielectric material;

a sensor assembly, comprising:

a primary coil wound around the sampling container; and a plurality of secondary coils encapsulated by the primary coil and wound around the sampling container, wherein each of the plurality of secondary coils is electrically connected to a capacitive element of different value and wherein the sampling container is configured to act as a dielectric layer between the sensor assembly and the sample of the multiphase fluid; and an analyzer inductively coupled to each of the plurality of secondary coils to measure a response of each secondary coil in response to an excitation signal provided to the primary coil.

17. The system as recited in claim 16, wherein the analyzer is coupled with a processing sub-system, wherein the processing sub-system is configured to perform multivariate analysis to determine the fluid levels based on the response of the plurality of secondary coils.

* * * * *